(12) United States Patent
Ishizu et al.

(10) Patent No.: US 11,364,643 B2
(45) Date of Patent: Jun. 21, 2022

(54) INSTALLING DEVICE AND ROBOT

(71) Applicant: KABUSHIKI KAISHA YASKAWA DENKI, Kitakyushu (JP)

(72) Inventors: Kensei Ishizu, Kitakyushu (JP); Makoto Tabata, Kitakyushu (JP); Hisayoshi Tsujibayashi, Kitakyushu (JP); Tsuyoshi Ito, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 224 days.

(21) Appl. No.: 16/566,883

(22) Filed: Sep. 11, 2019

(65) Prior Publication Data
US 2020/0086508 A1  Mar. 19, 2020

(30) Foreign Application Priority Data

Sep. 14, 2018 (JP) .............................. JP2018-172519

(51) Int. Cl.
*B25J 19/00* (2006.01)
*B25J 18/04* (2006.01)
*B25J 17/00* (2006.01)

(52) U.S. Cl.
CPC ............... *B25J 18/04* (2013.01); *B25J 17/00* (2013.01); *B25J 19/00* (2013.01)

(58) Field of Classification Search
CPC ..... B25J 9/12; B25J 17/00; B25J 19/00; B25J 19/0025; B25J 19/0041; H01R 13/58
USPC ........................................................ 439/532
See application file for complete search history.

(56) References Cited

U.S. PATENT DOCUMENTS

| | | | | |
|---|---|---|---|---|
| 5,544,005 A | * | 8/1996 | Horikoshi ............. | G06F 1/1632 361/679.08 |
| 6,431,018 B1 | * | 8/2002 | Okada .................. | B25J 19/0025 248/229.22 |
| 6,811,124 B2 | * | 11/2004 | Karlinger ............. | B25J 19/0025 248/49 |
| 7,810,765 B2 | * | 10/2010 | Burlot .................. | H02G 3/0481 248/75 |
| 8,549,950 B2 | * | 10/2013 | Lee ...................... | B25J 19/0029 74/490.02 |
| 8,746,631 B2 | * | 6/2014 | Hashimoto ....... | H01L 21/67766 248/49 |

(Continued)

FOREIGN PATENT DOCUMENTS

| | | |
|---|---|---|
| DE | 19616765 A1 | 11/1997 |
| JP | H04-090867 A | 3/1992 |

(Continued)

OTHER PUBLICATIONS

Extended Eruopean Search Report for corresponding EP Application No. 19195375.1, dated Mar. 10, 2020.

(Continued)

*Primary Examiner* — William C Joyce
(74) *Attorney, Agent, or Firm* — Mori & Ward, LLP

(57) ABSTRACT

An installing device includes a connection member and a linear motion support. The connection member is disposed at a base end portion of a hollow arm which extends in an extension direction and which has a hollow extending in the extension direction. A linear object passing through the hollow is connectable to the connection member. The linear motion support supports the connection member slidably with respect to the hollow arm in the extension direction.

17 Claims, 7 Drawing Sheets

(56) References Cited

U.S. PATENT DOCUMENTS

| | | | |
|---|---|---|---|
| 10,059,011 B2* | 8/2018 | Burlot | B25J 19/0025 |
| 11,040,457 B2* | 6/2021 | Carruthers | B66C 13/12 |
| 2008/0229861 A1 | 9/2008 | Inoue et al. | |
| 2014/0013893 A1* | 1/2014 | Asano | H02G 15/00 |
| | | | 74/490.02 |
| 2014/0030032 A1* | 1/2014 | Kuhn | B25J 19/00 |
| | | | 406/196 |
| 2015/0114162 A1* | 4/2015 | Kirihara | H01R 12/613 |
| | | | 74/490.02 |
| 2015/0328780 A1* | 11/2015 | Burlot | B25J 19/0025 |
| | | | 74/490.02 |
| 2016/0297081 A1* | 10/2016 | Watanabe | B25J 19/0025 |
| 2018/0333844 A1* | 11/2018 | Inoue | B23K 9/12 |

FOREIGN PATENT DOCUMENTS

| | | | |
|---|---|---|---|
| JP | H08-197482 A | | 8/1996 |
| JP | 2008-229762 A | | 10/2008 |
| JP | 2012-161903 | * | 8/2012 |
| JP | 6164009 B2 | | 4/2015 |
| JP | 2018-122404 | | 8/2018 |

OTHER PUBLICATIONS

Japanese Office Action for corresponding JP Application No. 2018-172519, Feb. 12, 2020 (w/ machine translation).

* cited by examiner

INSTALLING DEVICE AND ROBOT

CROSS-REFERENCE TO RELATED APPLICATIONS

The present application claims priority under 35 U.S.C. § 119 to Japanese Patent Application No. 2018-172519, filed Sep. 14, 2018. The contents of this application are incorporated herein by reference in their entirety.

BACKGROUND

Field of the Invention

The embodiments disclosed herein relate to an installing device and a robot.

Discussion of the Background

JP 2018-122404A discloses a robot that includes a plurality of joints. The robot makes a motion by driving the plurality of joints. At the leading end portion of the robot, an end effector is mounted. The end effector varies depending on the application in which the robot is used, such as welding and holding, so that the robot is capable of performing various kinds of work such as machining and moving of workpieces.

The end effector is connected with linear objects such as cables, and these linear objects are guided from the base of the robot to the end effector along the outer surface of the robot.

SUMMARY

According to one aspect of the present disclosure, an installing device includes a connection member and a linear motion support. The connection member is disposed at a base end portion of a hollow atm which extends in an extension direction and which has a hollow extending in the extension direction. A linear object passing through the hollow is connectable to the connection member. The linear motion support supports the connection member slidably with respect to the hollow arm in the extension direction.

According to another aspect of the present disclosure, a robot includes a base, a first arm, a second arm, a third arm, a fourth arm, and an installing device. The base is rotatable about a base axis of the base perpendicular to a ground surface. The first arm is supported by the base and turnable about a first axis perpendicular to the base axis. The second arm is supported by a leading end portion of the first arm at a base end portion of the second arm and turnable about a second axis parallel to the first axis. The third arm is supported at a base end portion of the third arm by a leading end portion of the second arm opposite to the base end portion of the second arm and rotatable about a third axis perpendicular to the second axis. The fourth arm is supported at a base end portion of the fourth arm by a leading end portion of the third arm opposite to the base end portion of the third arm and turnable about a fourth axis orthogonal to the third axis. The installing device includes a connection member and a linear motion support. The connection member is disposed at a base end portion of a hollow arm which extends in an extension direction and which has a hollow extending in the extension direction. A linear object passing through the hollow is connectable to the connection member. The linear motion support supports the connection member slidably with respect to the hollow arm in the extension direction. The hollow arm includes the second arm and the third arm.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 1 illustrates an outline of an installing device according to an embodiment;

FIG. 2 is a perspective view of a robot;

FIG. 3 is a side view of the robot;

FIG. 4 is a perspective view of the installing device;

FIG. 5A is a schematic illustrating a first example arrangement of a rotatable support;

FIG. 5B is a schematic illustrating a second example arrangement of the rotatable support;

FIG. 6 is a perspective view of an intermediate member; and

FIG. 7 is a block diagram illustrating a configuration of a robot system.

DESCRIPTION OF THE EMBODIMENTS

By referring to the accompanying drawings, an installing device and a robot according to embodiments will be described in detail below. It is noted that the following embodiments are provided for example purposes only and are not intended in a limiting sense. While in the following description the robot performs work using an end effector to apply sealing material, application of sealing material type of work is not intended as limiting the type of work to be performed. Other examples of work include, but are not limited to, picking, coating, and welding with respect to workpieces.

As used herein, the term "orthogonal" means, in a broad sense, exactly orthogonal or approximately orthogonal within some tolerance from exactly orthogonal. As used herein, the term "perpendicular" means, in a broad sense, exactly perpendicular or approximately perpendicular within some tolerance from exactly perpendicular. As used herein, the term "parallel" means, in a broad sense, exactly parallel or approximately parallel within some tolerance from exactly parallel. As used herein, the term "vertical" means, in a broad sense, exactly vertical or approximately vertical within some tolerance from exactly vertical. As used herein, the term "same" means, in a broad sense, exactly the same or approximately the same within some tolerance from exactly the same. As used herein, the term "identical" means, in a broad sense, exactly identical or approximately identical within some tolerance from exactly identical. As used herein, the term "equal" means, in a broad sense, exactly equal or approximately equal within some tolerance from exactly equal. As used herein, the phrase "in line with" means, in a broad sense, exactly overlapping or approximately overlapping within some tolerance from exactly overlapping. Thus, these terms and phrase are used taking into consideration production-related, installation-related, processing-related, and detection-related tolerances and errors.

An installing device 40 according to this embodiment will be outlined by referring to FIG. 1. FIG. 1 illustrates an outline of the installing device 40 according to this embodiment. FIG. 1 corresponds to a side view of a hollow arm 100.

Figure 1:
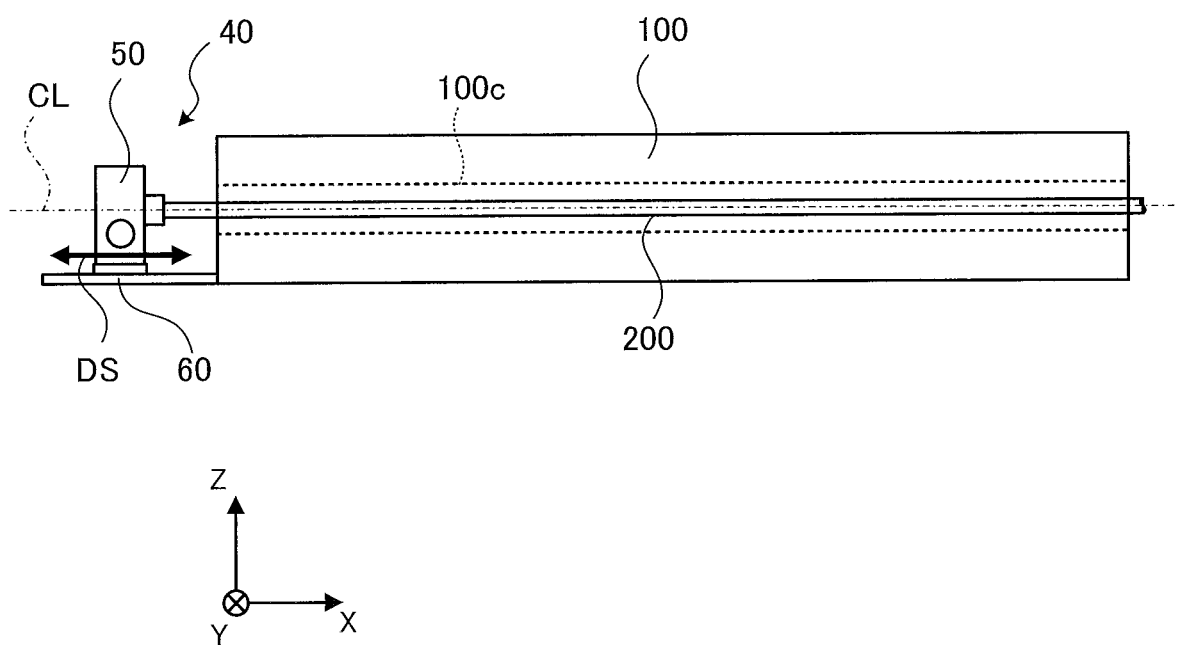

For ease of understanding of the following description, FIG. 1 is appended with a three-dimensional orthogonal coordinate system. In the coordinate system, the vertically upward direction corresponds to the positive direction of Z axis, and the extension direction of the hollow arm 100 is parallel to X axis. As used herein, the term "extension direction" of the hollow atm 100 is intended to include the direction toward the positive X side of the length of the hollow arm 100 and the direction toward the negative X side of the length of the hollow arm 100. The direction of the X axis toward a base end portion of the hollow arm 100 is the negative X direction, and the direction of the X axis toward a leading end portion of the hollow arm 100 is the positive X direction. As used herein, the term "base end portion" of the hollow arm 100 is intended to include the end of the hollow arm 100 on the negative X side and a portion offset from and proximate to the end of the hollow arm 100 on the negative X side. As used herein, the term "leading end portion" of the hollow arm 100 is intended to include the end of the hollow arm 100 on the positive X side and a portion offset from and proximate to the end of the hollow arm 100 on the positive X side. This orthogonal coordinate system may also be illustrated in some other drawings referred to in the following description.

As illustrated in FIG. 1, the installing device 40 is disposed at the base end portion of the hollow arm 100 (on the negative X side). The hollow arm 100 has a hollow shape with a hollow 100c formed in the hollow arm 100 and extending in the extension direction of the hollow arm 100.

Specifically, the hollow arm 100 has a hollow cylindrical shape with the hollow 100c constituting the inner surface of the hollow atm 100. As illustrated in FIG. 1, CL indicates the center line of the hollow atm 100. The center line CL is parallel to the extension direction of the hollow arm 100, that is, parallel to the X axis illustrated in FIG. 1. A linear object 200 passes through the hollow 100c of the hollow atm 100.

As illustrated in FIG. 1, the installing device 40 includes a connection member 50 and a linear motion support 60. The connection member 50 is connected with the linear object 200. The linear motion support 60 slidably supports the connection member 50. The linear object 200 is an elastic hose through which a fluid such as sealing material is flowable.

While in this embodiment the linear object 200 is a hose, a hose is not intended as limiting the linear object 200. Other examples of the linear object 200 include, but are not limited to, a cable such as an electric cable, a conduit cable (which is a combination of a plurality of kinds of cables), and a cable for a welding wire to pass through.

The connection member 50 is connected with a base end portion of the linear object 200. As used herein, the term "base end portion" of the linear object 200 is intended to include the end of the linear object 200 on the negative X side and a portion offset from and proximate to the end of the linear object 200 on the negative X side. Thus, the connection member 50 is disposed at the base end portion of the hollow arm 100 (which includes the hollow 100c, which extends in the extension direction (which is parallel to the X axis)), and is connected with the linear object 200, which passes through the hollow arm 100.

The linear motion support 60 is disposed on the end surface or a side surface of the hollow atm 100 at the base end portion of the hollow arm 100, and supports the connection member 50 slidably in the extension direction (which is parallel to the X axis) relative to the hollow arm 100. For reference purposes, FIG. 1 is appended with slide directions DS (which are parallel to the X axis) of the connection member 50.

That is, the installing device 40 has a linear motion mechanism that makes a linear motion in the extension direction of the hollow arm 100. In this embodiment, the linear motion support 60 corresponds to a linear guide, and the connection member 50 corresponds to a slider. It is to be noted that details of the installing device 40 will be described later by referring to FIG. 4.

When the linear object 200 is a hose (as in this embodiment), the hose may expand radially when the pressure of the internal fluid increases, resulting in a shortened total length of the hose. When the pressure of the internal fluid lowers, the hose contracts radially, making the total length of the hose back to its total length. That is, the hose is expandable and contractable in its length directions depending on the pressure of the fluid flowing through the hose.

In some applications, the hose may be fixed at both ends so that the hose is kept at a length small enough to keep the hose unloosened. When the pressure of the fluid in such hose keeps changing, the hose is constantly exposed to a force of making the hose expand and contract. This may cause fatigue to accumulate in the hose, occasionally resulting in a cracked or ruptured hose.

In light of this, the installing device 40 is provided with the connection member 50, which is slidable in directions parallel to the length of the linear object 200. By making the connection member 50 slide appropriately based on expansion and contraction of the hose, the force involved with the expansion and contraction of the hose is minimized, making the hose's service life longer.

While in this embodiment the linear object 200 is a hose that is expandable and contractable in the length direction of the hose (which is the direction in which the hose extends), the linear object 200 may be a non-elastic or less elastic object. For example, when the linear object 200 is a non-elastic object, the linear object 200 may equally be exposed to external force (such as twisting, or tension and/or pressing at a leading end portion of the linear object 200) in the length direction of the linear object 200. As used herein, the term "length direction" of the linear object 200 is intended to include the direction toward the positive X side of the length of the linear object 200 and the direction toward the negative X side of the length of the linear object 200.

Even in this case, the external force acting on the linear object 200 is released by the installing device 40 with the connection member 50, which is freely slidable in the length direction of the linear object 200. This makes the linear object 200's service life longer.

It is to be noted that the installing device 40 may include a rotation mechanism that is rotatable about a rotation axis parallel to the extension direction of the hollow arm 100, which will be described later by referring to FIGS. 4, 5A, and 5B. It is also to be noted that the installing device 40 may include an intermediate mechanism that connects the linear object 200 to a leading end portion of the hollow arm 100, which will be described later by referring to FIG. 6. As used herein, the term "leading end portion" of the hollow arm 100 is intended to include the end of the hollow arm 100 on the positive X side and a portion offset from and proximate to the end of the hollow arm 100 on the positive X side.

By referring to FIG. 2, description will be made with regard to an example configuration of a robot to which the installing device 40 illustrated in FIG. 1 is applicable. FIG.

2 is a perspective view, from a diagonally upward position, of a robot 10. In FIG. 2, the installing device 40 illustrated in FIG. 1 is omitted.

Figure 2:
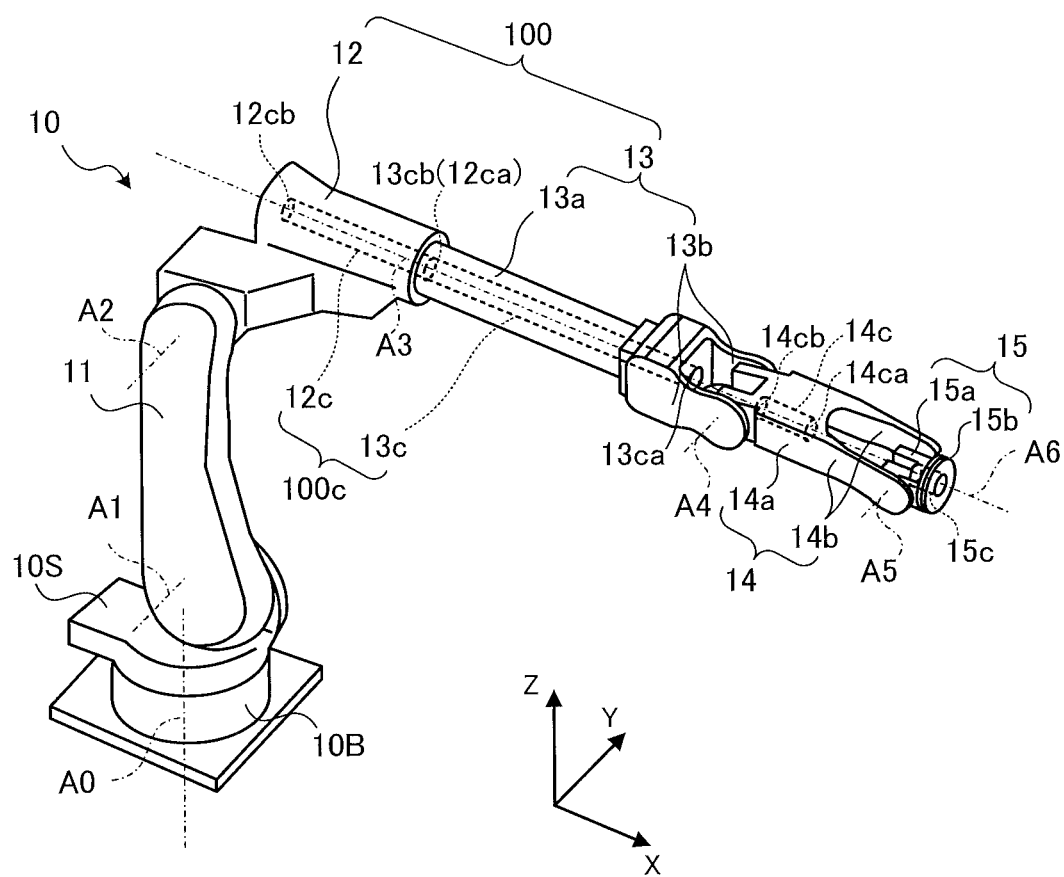

As illustrated in FIG. 2, the robot 10 is a "vertical multi-articular robot" having seven axes, namely, vertical axis A0, first axis A1, second axis A2, third axis A3, fourth axis A4, fifth axis A5, and sixth axis A6. Also, the robot 10 includes (in increasing order of distance from the base end) a base 10B, a turnable member 10S, a first arm 11, a second arm 12, a third arm 13, a fourth arm 14, and a wrist 15. As used herein, the term "base end portion" of each of the elements of the robot 10 (including the above-described elements) is intended to include the end of the element on the side closer to the base 10B and a portion offset from and proximate to the end of the element on the side closer to the base 10B. As used herein, the term "leading end portion" of each of the elements of the robot 10 (including the above-described elements) is intended to include the end of the element on the side closer to the wrist 15 and a portion offset from and proximate to the end of the element on the side closer to the wrist 15.

As illustrated in FIG. 2, the third arm 13 and the fourth arm 14 each have a "two-forked shape" at the leading end portion of each arm. The two-forked shape has an "open space". With the robot 10 taking the posture illustrated in FIG. 2, the open space is open in at least one of the vertical directions (directions parallel to the Z axis). That is, the third arm 13 and the fourth arm 14 each have an open space that is open in one of the radial directions of each arm perpendicular to the extension direction in which each arm extends.

As illustrated in FIG. 2, the fourth arm 14 also has a "two-forked shape" at the base end portion of the fourth arm 14. By forming the base end portion of the fourth arm 14 in a two-forked shape, the two-forked shape at the leading end portion of the third arm 14 faces the two-forked shape at the base end portion of the fourth arm 14. This enlarges the open space of the third arm 13.

Also, the wrist 15 has a two-forked shape at a base end portion of the wrist 15. By forming the base end portion of the wrist 15 in a two-forked shape, the two-forked shape at a leading end portion of the fourth arm 14 faces the two-forked shape at the base end portion of the wrist 15. This enlarges the open space of the fourth arm 14.

The second arm 12 has a second through hole 12c. The second through hole 12c extends along the third axis A3. The opening of the second through hole 12c at its base end portion (end portion on the negative X side) is an opening 12cb, and the opening of the second through hole 12c at its leading end portion (end portion on the positive X side) is an opening 12ca. The second through hole 12c has a center line that is preferably identical to the third axis A3.

The third arm 13 has a third through hole 13c. The third through hole 13c extends along the third axis A3. The opening of the third through hole 13c at its base end portion (end portion on the negative X side) is an opening 13cb, and the opening of the third through hole 13c at its leading end portion (end portion on the positive X side) is an opening 13ca. The third through hole 13c has a center line that is preferably identical to the third axis A3.

Figure 3:
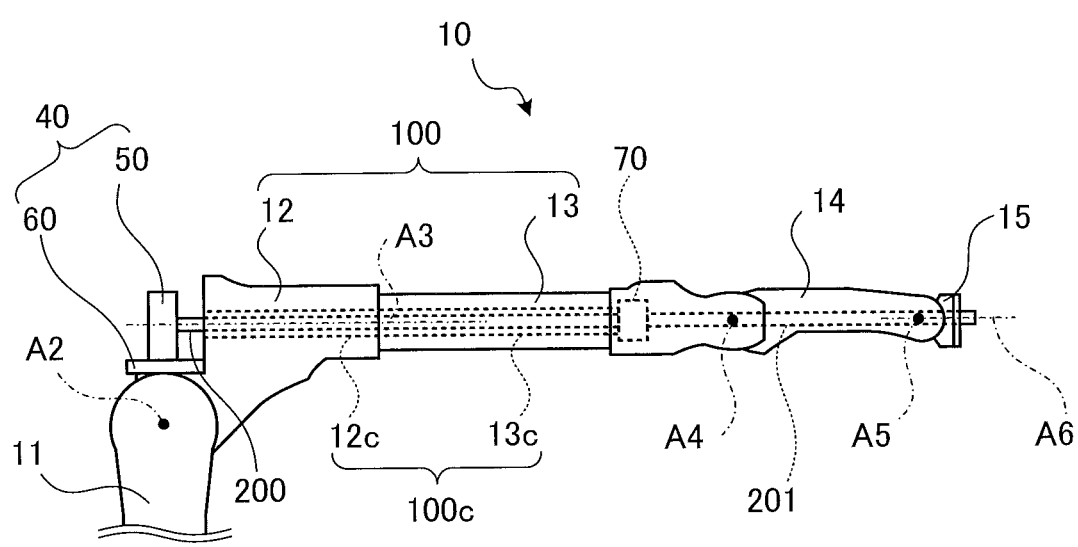

A hollow arm (an example of "a hollow robot arm") 100 in FIGS. 2 and 3 includes the second arm 12 and the third arm 13. The second arm 12 and the third arm 13 correspond to the hollow arm 100 illustrated in FIG. 1, and the second through hole 12c and the third through hole 13c correspond to the hollow 100c illustrated in FIG. 1.

A configuration of the robot 10 will be described in more detail below. The base 10B is disposed on an installation surface such as a floor surface. The turnable member 10S is supported by the base 10B and is rotatable about the vertical axis A0, which is perpendicular to the installation surface (the vertical axis A0 is a non-limiting example of the base axis recited in the appended claims). The first arm 11 is supported by the turnable member 10S and is turnable about the first axis A1, which is perpendicular to the vertical axis A0. The second arm 12 is supported by the first arm 11 and is turnable about the second axis A2, which is parallel to the first axis A1.

The third atm 13 is, at its base end portion, supported by the second arm 12 and is rotatable about the third axis A3, which is perpendicular to the second axis A2. The third arm 13 includes a third main portion 13a and two third extensions 13b. The third main portion 13a has the third through hole 13c, which extends along the third axis A3. The two third extensions 13b are disposed at positions on the third main portion 13a offset from the opening 13ca of the third through hole 13c, and extend toward a leading end portion of the robot 10 along the third axis A3.

Specifically, as illustrated in FIG. 2, the two third extensions 13b are arranged such that the opening 13ca is located between the two third extensions 13b. By providing two third extensions 13b, the fourth arm 14 is supported by a double cantilever structure formed by the two third extensions 13b. In another possible embodiment, one of the two third extensions 13b is omitted, that is, the third arm 13 has a single cantilever structure.

The fourth arm 14 is, at its base end portion, supported by the leading end portion of the third arm 13 and is turnable about the fourth axis A4, which is orthogonal to the third axis A3. The fourth arm 14 includes a fourth main portion 14a and two fourth extensions 14b. The fourth main portion 14a has a fourth through hole 14c. The fourth through hole 14c extends along the third axis A3 with the fourth arm 14 taking such a posture that the fifth axis A5 is on the third axis A3.

The opening of the fourth through hole 14c at its base end portion (end portion on the negative X side) is an opening 14cb, and the opening of the fourth through hole 14c at its leading end portion (end portion on the positive X side) is an opening 14ca. The fourth through hole 14e has a center line that is preferably identical to the third axis A3 with the fourth arm 14 taking the posture illustrated in FIG. 2. The two fourth extensions 14b are arranged at positions on the fourth main portion 14a offset from the opening 14ca of the fourth through hole 14c, and extend toward the leading end portion of the robot 10 along the third axis A3.

Specifically, as illustrated in FIG. 2, the two fourth extensions 14b are arranged such that the opening 14ca is located between the two fourth extensions 14b. By providing two fourth extensions 14b, the wrist 15 is supported by a double cantilever structure formed by the two fourth extensions 14b. In another possible embodiment, one of the two fourth extensions 14b is omitted, that is, the fourth arm 14 has a single cantilever structure.

The wrist 15 includes a turnable member 15a and a rotatable member 15b. The turnable member 15a is, at its base end portion, supported by the leading end portion of the fourth arm 14 and is turnable about the fifth axis A5, which is parallel to the fourth axis A4. The rotatable member 15b is, at its base end portion, supported by a leading end portion of the turnable member 15a and is rotatable about the sixth axis A6, which is orthogonal to the fifth axis A5.

The wrist 15 has a through hole 15c. The through hole 15c extends along the third axis A3 with the wrist 15 taking such a posture that the third axis A3 and the sixth axis A6 are in line with each other. An end effector is mounted on a leading end portion of the wrist 15 (that is, at a leading end portion of the rotatable member 15b) in an attachable and detachable manner. The end effector can be varied depending on the type of work that the robot 10 performs.

The ratio between the distance between the second axis A2 and the fourth axis A4 in the X axis direction and the distance between the fourth axis A4 and the fifth axis A5 in the X axis direction is preferably in the range between "2:1" and "4:1". More preferably, the ratio is approximately "3:1". This is because if the distance between the fourth axis A4 and the fifth axis A5 is too short relative to the distance between the second axis A2 and the fourth axis A4, the reachable range of the wrist 15 may become narrow in a small space.

By referring to FIG. 3, a side profile of the robot 10 will be described. FIG. 3 is a side view of the robot 10. It is to be noted that the posture of the robot 10 illustrated in FIG. 3 is identical to the posture of the robot 10 illustrated in FIG. 2. It is also to be noted that the elements of the robot 10 illustrated in FIG. 3 are the leading end portion of the first arm 11 and the elements closer to the leading end portion of the robot 10 than the leading end portion of the first arm 11. FIG. 3 also illustrates the installing device 40 illustrated in FIG. 1. It is also to be noted that the elements of the robot 10 that have already been described by referring to FIG. 2 will not be elaborated upon again here.

The robot 10 is capable of taking the posture illustrated in FIG. 3. Specifically, the third axis A3 and the sixth axis A6 are in line with each other, and the fourth axis A4 and the fifth axis A5 are on the line formed by the third axis A3 and the sixth axis A6. At a base end portion of the second arm 12, the linear motion support 60 is disposed. The linear motion support 60 supports the connection member 50, to which the base end portion of the linear object 200 is connected. The connection member 50 is capable of making a linear motion freely in the extension direction of the hollow arm 100 (the second arm 12 and the third arm 13).

The linear object 200 passes through the hollow 100c of the hollow arm 100 (the second through hole 12c and the third through hole 13c). An intermediate member 70 is disposed at a leading end portion of the third through hole 13c of the third arm 13. A base end portion of the intermediate member 70 is connected with the leading end portion of the linear object 200. Also, a leading end portion of the intermediate member 70 is connected with a base end portion of a second linear object 201. The second linear object 201 extends toward the end effector connected to the wrist 15. A leading end portion of the second linear object 201 is connected to the end effector. A configuration of the intermediate member 70 will be described later by referring to FIG. 6.

Thus, the hose connected to the end effector is divided by the intermediate member 70 into the linear object 200 and the second linear object 201. This ensures that a member having properties suitable for the linear object 200 can be selectively used, and that a member having properties suitable for the second linear object 201 can be selectively used.

For example, the linear object 200 may be made of a hard-to-bend material since the hollow arm 100, through which the linear object 200 passes, is not bendable. In contrast, the second linear object 201 may be made of an easy-to-bend material since the fourth arm 14 and the wrist 15, through which the second linear object 201 passes, are bendable when the fourth arm 14 and the wrist 15 turn respectively about the fourth axis A4 and the fifth axis A5. It is to be noted that the linear object 200 and the second linear object 201 may be made of materials that are identical in size, material, and/or property.

In another possible embodiment, it is possible to omit the intermediate member 70 and route a single linear object 200 from the installing device 40 to the end effector. In still another possible embodiment, the intermediate member 70 may have a through hole larger in outer diameter than the linear object 200, and have such a function as to guide the movement of the linear object 200 in the X axis direction and the rotation of the linear object 200 about the X axis.

When the fourth arm 14 and/or the wrist 15 turn, the linear object 200 may be pulled in a direction away from the installing device 40 or pressed in a direction toward the installing device 40. In light of this, the connection member 50 of the installing device 40 makes a slide movement to release the external force acting on the linear object 200, as described above, making the linear object 200's service life longer.

Also as described above by referring to FIG. 3, the second linear object 201, which is separate from the linear object 200, is used as well as the linear object 200. The second linear object 201 is bendable gently in such a manner that the second linear object 201 protrudes out of the robot 10, because of the above-described open spaces provided at the leading end portion of the third arm 13 and at the base and leading end portions of the fourth atm 14. This prevents the second linear object 201 from being forcibly bent, making the second linear object 201's service life longer.

In the following description, the third arm 13 and the fourth arm 14 will occasionally be referred to as "open arm". The second linear object 201 passes through the open arm that is turnable relative to the hollow arm 100 and that is open in at least one of the radial directions of the open arm perpendicular to the extension direction in which the open arm extends. Providing the second linear object 201 in the open arm prevents the second linear object 201 from being forcibly bent, making the second linear object 201's service life longer.

The installing device 40 will be described by referring to FIG. 4. FIG. 4 is a perspective view of the installing device 40. As described above by referring to FIG. 1, the linear motion support 60 of the installing device 40 is disposed at the base end portion of the hollow atm 100.

Figure 4:
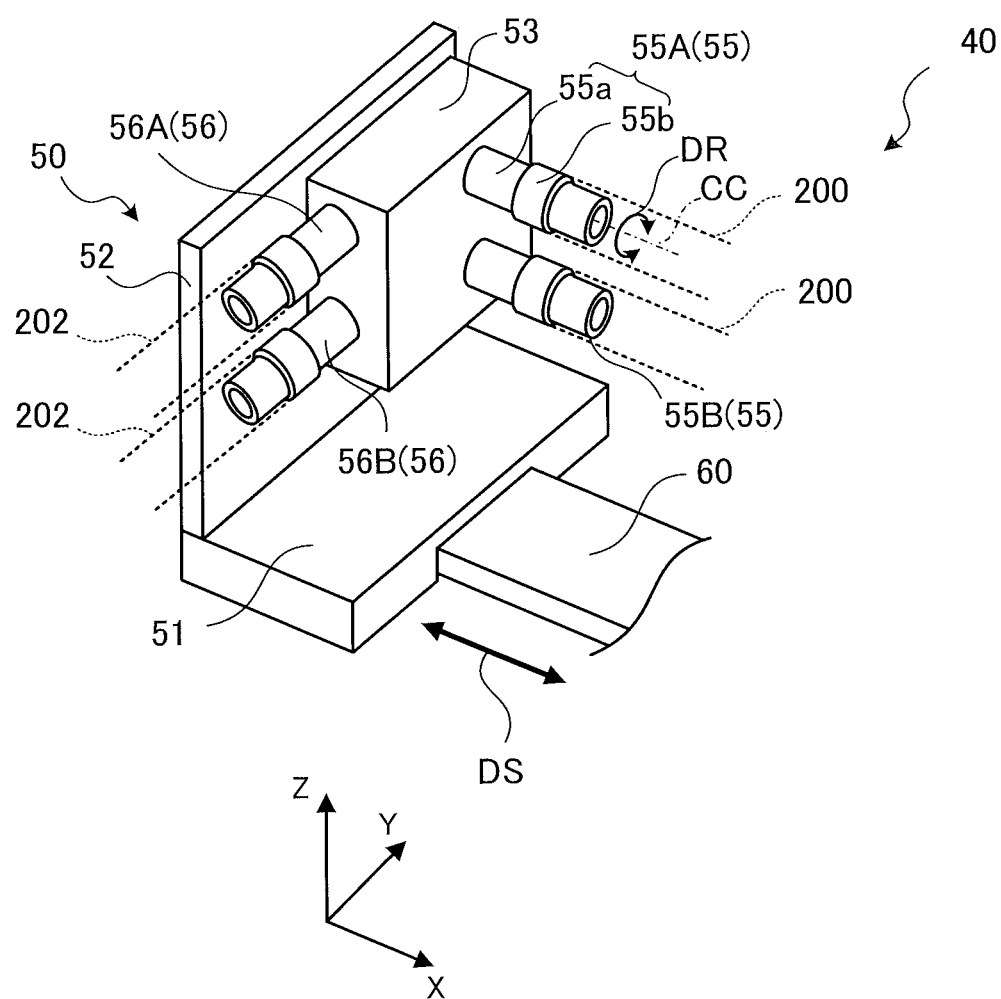

As illustrated in FIG. 4, the installing device 40 includes the connection member 50 and the linear motion support 60. The linear motion support 60 supports the connection member 50 slidably in slide directions DS. The connection member 50 includes a slider 51, a support 52, a body 53, two connection ports 55, and two base-end connection ports 56.

While in FIG. 4 two connection ports 55 and two base-end connection ports 56 are provided, a single connection port 55 and a single base-end connection port 56 may be provided, or three or more connection ports 55 and three or more base-end connection ports 56 may be provided. In the following description, the two connection ports 55 will be occasionally distinguished from each other by referring to one connection port as connection port 55A and referring to the other connection port as connection port 55B. Likewise, the two base-end connection ports 56 will be occasionally distinguished from each other by referring to one base-end connection port as base-end connection port 56A and referring to the other base-end connection port as base-end connection port 56B.

The slider 51 is slidable in the slide directions DS (toward the positive X side and the negative X side) relative to the linear motion support 60. As described above, the linear motion support 60 is a linear guide in this embodiment. The support 52 stands on the slider 51 and supports the body 53.

As illustrated in FIG. 4, the body 53 has a rectangular parallelepiped shape. The connection ports 55 are disposed on the front surface of the body 53 facing the hollow arm 100 (see FIG. 1). The base-end connection ports 56 are disposed on a side surface of the body 53. It is to be noted that the base-end connection ports 56 may be disposed on a side surface of the body 53 different from the side surface illustrated in FIG. 4, or may be disposed on the rear surface of the body 53.

The connection ports 55 each have a through hole penetrating through each connection port 55, and the base-end connection ports 56 each have a through hole penetrating through each base-end connection port 56. The body 53 includes two internal conduits disposed in the body 53. One of the internal conduits connects the through hole of the connection port 55A and the through hole of the base-end connection port 56A to each other. The other internal conduit connects the through hole of the connection port 55B and the through hole of the base-end connection port 56B to each other. The connection port 55A is connected with one linear object 200, and the connection port 55B is connected with another linear object 200. The base-end connection port 56A is connected with a third linear object 202, and the base-end connection port 56B is connected with another third linear object 202.

Thus, the hoses connected to the end effector are divided by the connection member 50 into the linear object 200 and the third linear object 202. This ensures that a member having properties suitable for the linear object 200 can be selectively used, and that a member having properties suitable for the third linear object 202 can be selectively used. It is to be noted that the linear object 200 and the third linear object 202 may be made of materials that are identical in size, material, and/or property.

Each connection port 55 includes a fixed member 55a and a rotatable member 55b. The fixed member 55a is fixed to the body 53. The rotatable member 55b is rotatable freely about a rotation axis CC relative to the fixed member 55a (see rotation directions DR illustrated in FIG. 4). The connection port 55, which corresponds to the "rotatable support" recited in the appended claims, supports the linear object 200 rotatably about an axis parallel to the third axis A3 illustrated in FIG. 2 (the third axis A3 corresponds to the rotation axis recited in the appended claims). In the following description, the connection port 55 provided with the rotatable member 55b will occasionally be referred to as "swivel".

The rotation axis CC is preferably parallel to the slide directions DS. When there is only a single connection port 55 provided, the rotation axis CC is preferably in line with the center line CL illustrated in FIG. 1 and/or the third axis A3 illustrated in FIG. 2. The base-end connection port 56 may have a configuration similar to the configuration of the connection port 55, or a rotation mechanism may be omitted from the base-end connection port 56.

Providing the connection port 55 to serve as a rotatable support minimizes the force acting on the linear object 200 when the linear object 200 are rotated or twisted, making the linear object 200's service life longer.

In applications in which sealing material is used and caused to flow through the linear objects 200 and the third linear objects 202, the line including the connection port 55A and the base-end connection port 56A may be used to supply the sealing material to the end effector, and the line including the connection port 55B and the base-end connection port 56B may be used to collect the sealing material from the end effector.

It is to be noted that the shape of the installing device 40 illustrated in FIG. 4 has been provided for exemplary purposes; the installing device 40 may have any other shape insofar as the installing device 40 is provided with a mechanism to make a linear motion in the slide directions DS relative to the hollow arm 100.

By referring to FIGS. 5A and 5B, description will be made with regard to an example arrangement of the connection ports 55 (rotatable supports 55). FIG. 5A is a view of the rotatable support 55 from the hollow arm 100 (see FIG. 1), schematically illustrating a first example arrangement of the rotatable support 55. FIG. 5B is a view of the rotatable supports 55 from the hollow arm 100, schematically illustrating a second example arrangement of the rotatable supports 55.

Figure 5A:
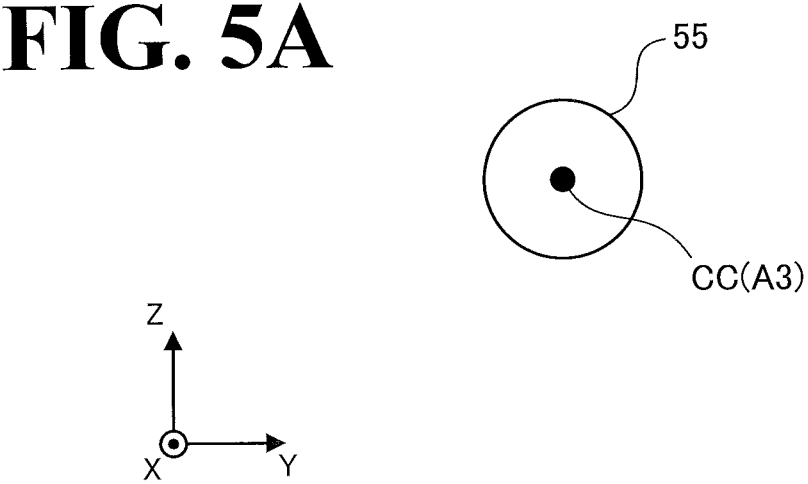

As illustrated in FIG. 5A, when a single rotatable support (connection port) 55 is provided, the rotatable support (connection port) 55 is preferably arranged such that the rotation axis of CC of the rotatable support (connection port) 55 is in line with the third axis A3 illustrated in FIG. 2. This enhances the effect of restraining twisting of the linear object 200 (see FIG. 4). It is to be noted that the rotation axis CC and the third axis A3 may be offset from each other by a predetermined distance.

Figure 5B:
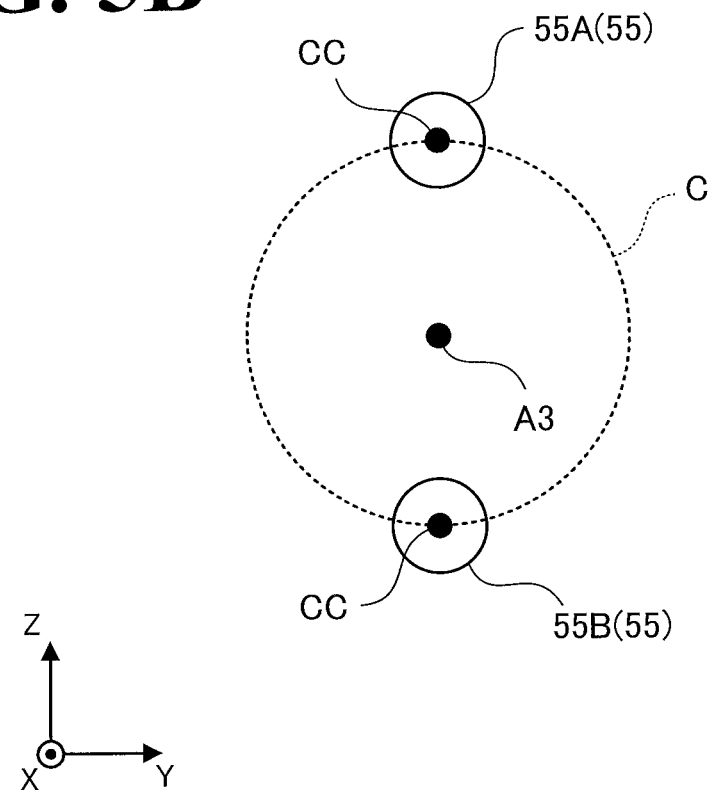

As illustrated in FIG. 5B, when two rotatable supports (connection ports) 55 are provided, the rotatable supports (connection ports) are preferably arranged such that the rotation axes of CC of the rotatable supports (connection ports) 55 are on the circumference of circle C, whose center is the third axis A3 illustrated in FIG. 2.

This ensures that the two rotatable supports (connection ports) 55 are at the same distance from the third rotation axis A3. This, in turn, minimizes the maximum value of the force acting on each of the linear objects 200 when the linear objects 200 are twisted. As a result, the linear object 200's service life becomes longer. It is to be noted that the center of the circle C and the third axis A3 may be offset from each other by a predetermined distance.

While in FIG. 5B the rotation axes CC of the two connection ports 55 are on the circle C, the connection ports 55 may be arranged such that each connection port 55 at least overlaps the circumference of the circle C. Even in this case, the connection ports 55 are approximately at the same distance from the center of the circle C.

As illustrated in FIG. 5B, two rotatable supports 55 are provided. In this case, the rotatable supports 55 are preferably arranged to face each other across the center of the circle C, as illustrated in FIG. 5B. When three or more rotatable supports 55 are provided, the rotatable supports 55 are preferably arranged at equal intervals on the circumference of the circle C.

Figure 6:
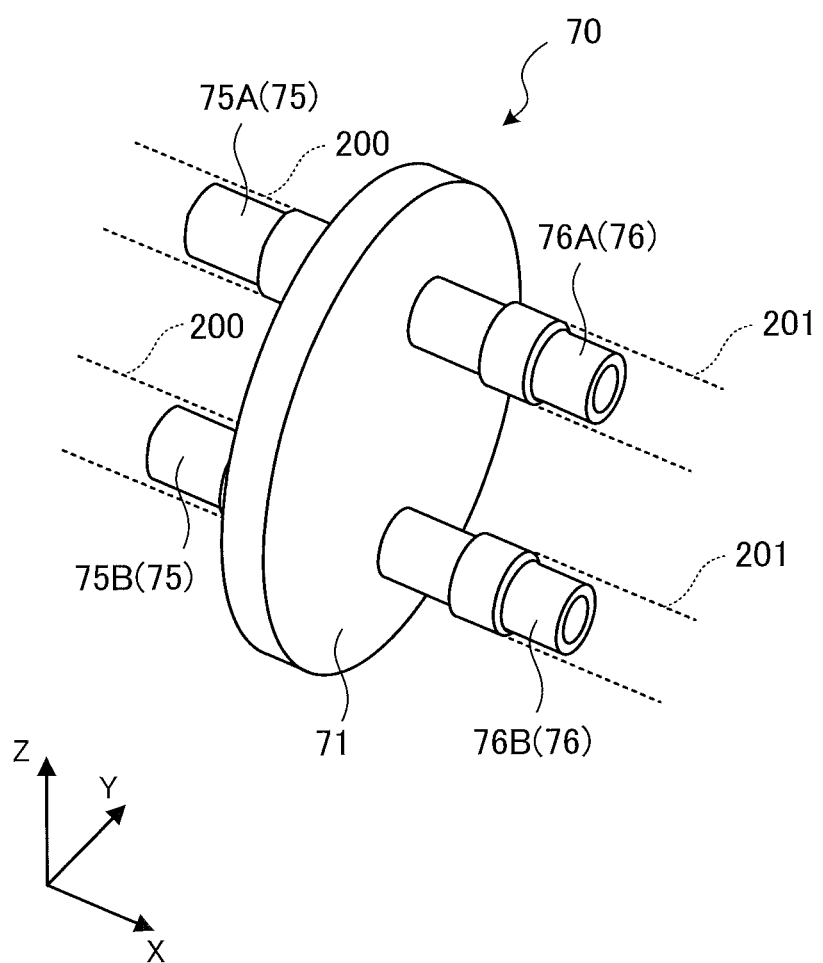

By referring to FIG. 6, the intermediate member 70 illustrated in FIG. 3 will be described. FIG. 6 is a perspective view of the intermediate member 70. It is to be noted that as illustrated in FIG. 3, the intermediate member 70 is disposed at the leading end portion of the hollow arm 100. That is, the intermediate member 70 is connected with the leading end portion of the linear object 200. It is to be noted that the installing device 40 may be regarded as including the intermediate member 70 illustrated in FIG. 6, as well as the connection member 50 and the linear motion support 60.

As illustrated in FIG. 6, the intermediate member 70 includes a body 71. The body 71 has a circular plate shape. The body 71 includes connection ports 75 and leading-end connection ports 76. The connection ports 75 are disposed at a base end portion (end portion on the negative X side) of the body 71, and the leading-end connection ports 76 are disposed at a leading end portion (end portion on the positive X side) of the body 71.

While in FIG. 6 two connection ports 75 and two leading-end connection ports 76 are provided, a single connection port 75 and a single leading-end connection port 76 may be provided, or three or more connection ports 75 and three or more leading-end connection ports 76 may be provided. In the following description, the two connection ports 75 will be occasionally distinguished from each other by referring to one connection port as connection port 75A and referring to the other connection port as connection port 75B. Likewise, the two leading-end connection ports 76 will be occasionally distinguished from each other by referring to one leading-end connection port as leading-end connection port 76A and referring to the other leading-end connection port as 76B.

The connection ports 75 each have a through hole penetrating through each connection port 75, and the leading-end connection ports 76 each have a through hole penetrating through each leading-end connection port 76. The body 71 includes two internal conduits disposed in the body 71. One of the internal conduits connects the through hole of the connection port 75A and the through hole of the leading-end connection port 76A to each other. The other internal conduit connects the through hole of the connection port 75B and the through hole of the leading-end connection port 76B to each other. Also, the connection port 75A is connected with the one linear object 200, and the connection port 75B is connected with the other linear object 200. The leading-end connection port 76A is connected with the one second linear object 201, and the leading-end connection port 76B is connected with the other second linear object 201.

The body 71 covers the opening 13ca of the third through hole 13c of the hollow 100c illustrated in FIG. 2. Thus, the intermediate member 70 is disposed at the leading end portion of the hollow arm 100; is connected with the linear objects 200 at a base end portion of the intermediate member 70; and is connected with the second linear objects 201 (which extend toward the end effector) at a leading end portion of the intermediate member 70.

Thus, the hose connected to the end effector is divided by the intermediate member 70 into the linear object 200 and the second linear object 201. This ensures that a member having properties suitable for the linear object 200 can be selectively used, and that a member having properties suitable for the second linear object 201 can be selectively used. It is to be noted that the linear object 200 and the second linear object 201 may be made of materials that are identical in size, material, and/or property.

The connection port 75A is connected with the leading end portion of the one linear object 200, whose base end portion is connected with the connection port 55A as illustrated in FIG. 4. The connection port 75B is connected with the leading end portion of the other linear object 200, whose base end portion is connected with the connection port 55B as illustrated in FIG. 4. The connection port 75A and the connection port 75B preferably have a positional relationship similar to the positional relationship between the connection port 55A and the connection port 55B. When a single connection port 75 is provided, the connection port 75 is preferably arranged in a manner similar to the manner illustrated in FIG. 5A. When two connection ports 75 are provided, the two connection ports 75 are preferably arranged in a manner similar to the manner illustrated in FIG. 5B.

Each connection port 75 includes a rotation mechanism similar to the rotation mechanism of each connection port 55. It is to be noted that the connection ports 75 may be made of a material that is similar to or the same as the material of the connection ports 55. The same applies to the leading-end connection ports 76, except that each leading-end connection port 76 may not necessarily be provided with a rotation mechanism. It is to be noted that the body 71 itself may be provided with a rotation mechanism that is rotatable about an axis parallel to the X axis.

Figure 7:
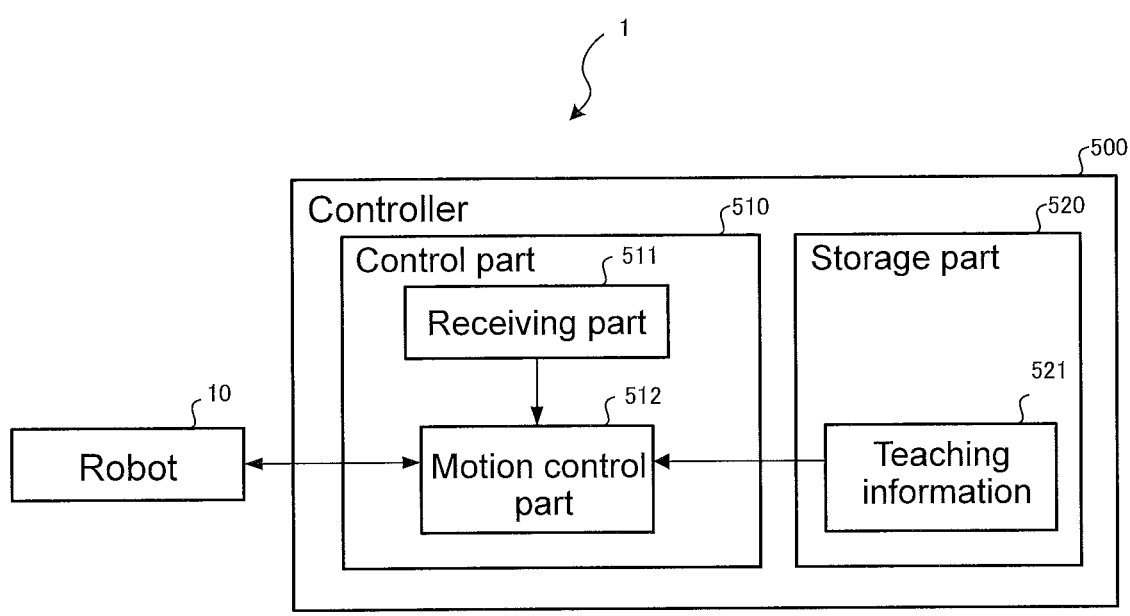

By referring to FIG. 7, a configuration of a robot system 1 according to this embodiment will be described. FIG. 7 is a block diagram illustrating a configuration of the robot system 1. As illustrated in FIG. 7, the robot system 1 includes the robot 10 and a controller 500. The robot 10 is connected to the controller 500. It is to be noted that a plurality of robots 10 may be connected to the controller 500.

The controller 500 includes a control part 510 and a storage part 520. The control part 510 includes a receiving part 511 and a motion control part 512. The storage part 520 stores teaching information 521. While in FIG. 7 a single controller 500 is provided, it is possible to use a plurality of controllers 500 when a plurality of robots 10 are provided, so that the plurality of controllers 500 perform motion control of the plurality of respective robots 10. In this case, it is possible to provide an upper-level controller that controls over the plurality of controllers 500.

The controller 500 includes a computer and various circuits. The computer includes a central processing unit (CPU), a read only memory (ROM), a random access memory (RAM), a hard disk drive (HDD), and input-output ports.

The CPU of the computer reads programs stored in the ROM and executes the programs to serve the functions of the receiving part 511 and the motion control part 512 of the control part 510. Also, at least one or all of the receiving part 511 and the motion control part 512 may be implemented by hardware such as ASIC (Application Specific Integrated Circuit) and FPGA (Field Programmable Gate Array).

The storage part 520 corresponds to the RAM and/or the HDD. The RAM and the HDD are capable of storing the teaching information 521. It is to be noted that the controller 500 may obtain the above-described programs and various kinds of information from another computer connected to the controller 500 through a wired or wireless network or from a portable recording medium. Further, there may be provided a plurality of controllers 500 communicative to each other, as described above, or a plurality of controllers 500 may be implemented in a hierarchical configuration in which one controller 500 is communicative to a higher or lower controller 500.

The control part 510 performs motion control of the robot 10. When a plurality of controllers 500 are provided, the control part 510 may also perform processing of synchronizing the controllers 500.

The receiving part 511 receives information indicating the presence and absence of a workpiece and/or indicating the shape of a workpiece, and receives information indicating a work position. Based on the information that has been received, the receiving part 511 determines the motion timing at which the robot 10 makes a motion, and/or determines details of the motion. Then, the receiving part 511 notifies the motion timing and the details of the motion to the motion control part 512. For example, the receiving part 511 obtains the timing at which a workpiece is placed at a predetermined position. Then, the receiving part 511 instructs the motion control part 512 to cause the robot 10 to make the motion at the timing that has been obtained.

In response to the instruction from the receiving part 511, the motion control part 512 controls the robot 10 to make the motion based on the teaching information 521. The motion control part 512 improves the accuracy of the motion of the robot 10 by, for example, performing feedback control using encoder values from actuators, such as motors, that serve as motive power sources of the robot 10. The teaching information 521 is prepared in the teaching stage, in which the robot 10 is taught the motion, and includes "jobs" that constitute a program defining a motion path of the robot 10.

As has been described hereinbefore, the installing device 40 according to this embodiment includes the connection member 50 and the linear motion support 60. The connection member 50 is disposed at the base end portion of the hollow arm 100. The hollow arm 100 includes the hollow 100c, which extends in the extension direction of the hollow arm 100. To the connection member 50, the linear object 200, which passes through the hollow arm 100, is connected. The linear motion support 60 supports the connection member 50 slidably in the extension direction of the hollow arm 100 relative to the hollow arm 100. Thus, the connection member 50 of the installing device 40 is slidable in the extension direction of the hollow arm 100. This configuration minimizes the force acting on the linear object 200. As a result, the installing device 40 according to this embodiment makes the linear object 200's service life longer.

As has been described hereinbefore, the robot 10 according to this embodiment includes the base 10B, the first arm 11, the second arm 12, the third arm 13, the fourth arm 14, and the above-described installing device 40. The base 10B is rotatable about the vertical axis A0, which is perpendicular to the ground surface. The first arm 11 is supported by the base 10B and is turnable about the first axis A1, which is perpendicular to the vertical axis A0. The second arm 12 is, at its base end portion, supported by the leading end portion of the first arm 11, and is turnable about the second axis A2, which is parallel to the first axis A1. The third arm 13 is, at its base end portion, supported by the leading end portion of the second arm 12, and is rotatable about the third axis A3, which is orthogonal to the second axis A2. The fourth arm 14 is, at its base end portion, supported by the leading end portion of the third arm 13, and is turnable about the fourth axis A4, which is orthogonal to the third axis A3. The hollow arm 100 corresponds to the second arm 12 and the third arm 13. Providing the robot 10 with the installing device 40 results in the robot 10 making the linear object 200's service life longer.

While in the above-described embodiment the robot 10 is described as a seven-axis robot, the robot 10 may be a robot having eight or more axes or a robot having equal to or less than six axes. Also, the installing device 40 may be applied to structures other than the robot 10.

Obviously, numerous modifications and error of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. An installing device comprising:
   a connection member disposed at a base end portion of a hollow robot arm which extends in an extension direction and which has a hollow extending in the extension direction, a linear object passing through the hollow and having an end which projects from the base end portion of the hollow robot arm and which is connected to the connection member; and
   a linear motion support supporting the connection member slidably with respect to the hollow arm in the extension direction,
   wherein the hollow robot arm has a leading end portion opposite to the base end portion in the extension direction, the leading end portion being rotatable about a rotation axis which extends in the extension direction, and
   wherein the connection member comprises a rotatable support supporting the linear object rotatably about an axis parallel to the rotation axis.

2. The installing device according to claim 1, wherein the linear object comprises a hose that is expandable and contractable in a length direction of the hose according to a pressure of a fluid provided in the hose.

3. The installing device according to claim 2,
   wherein a second linear object is provided, and
   wherein the connection member comprises a connection port connectable to the linear object and an additional connection port connectable to the second linear object, a distance between the connection port and the rotation axis being equal to a distance between the additional connection port and the rotation axis.

4. The installing device according to claim 3, further comprising:
   an intermediate member disposed at a leading end portion of the hollow arm, the leading end portion being opposite to the base end portion in the extension direction,
   wherein the linear object is connectable to a base end portion of the intermediate member, and
   wherein a second linear object extending toward an end effector of the hollow arm is connectable to a leading end portion of the intermediate member.

5. The installing device according to claim 4, wherein the second linear object is passable through an open arm that is turnable relative to the hollow arm and that is open on at least one surface of the open arm in a radial direction perpendicular to an extension direction in which the open arm extends.

6. The installing device according to claim 2, further comprising:
   an intermediate member disposed at a leading end portion of the hollow arm, the leading end portion being opposite to the base end portion in the extension direction,
   wherein the linear object is connectable to a base end portion of the intermediate member, and
   wherein a second linear object extending toward an end effector of the hollow arm is connectable to a leading end portion of the intermediate member.

7. The installing device according to claim 6, wherein the second linear object is passable through an open arm that is turnable relative to the hollow arm and that is open on at least one surface of the open arm in a radial direction perpendicular to an extension direction in which the open arm extends.

8. The installing device according to claim 2, further comprising:
   an intermediate member disposed at a leading end portion of the hollow arm, the leading end portion being opposite to the base end portion in the extension direction,
   wherein the linear object is connectable to a base end portion of the intermediate member, and wherein a second linear object extending toward an end effector of the hollow arm is connectable to a leading end portion of the intermediate member.

9. The installing device according to claim 8, wherein the second linear object is passable through an open arm that is turnable relative to the hollow arm and that is open on at least one surface of the open arm in a radial direction perpendicular to an extension direction in which the open arm extends.

10. The installing device according to claim 1,
wherein a second linear object is provided, and
wherein the connection member comprises a connection port connectable to the linear object and an additional connection port connectable to the second linear object, a distance between the connection port and the rotation axis being equal to a distance between the additional connection port and the rotation axis.

11. The installing device according to claim 10, further comprising:
an intermediate member disposed at a leading end portion of the hollow arm, the leading end portion being opposite to the base end portion in the extension direction,
wherein the linear object is connectable to a base end portion of the intermediate member, and
wherein a second linear object extending toward an end effector of the hollow arm is connectable to a leading end portion of the intermediate member.

12. The installing device according to claim 11, wherein the second linear object is passable through an open arm that is turnable relative to the hollow arm and that is open on at least one surface of the open arm in a radial direction perpendicular to an extension direction in which the open arm extends.

13. The installing device according to claim 1, further comprising:
an intermediate member disposed at a leading end portion of the hollow arm, the leading end portion being opposite to the base end portion in the extension direction,
wherein the linear object is connectable to a base end portion of the intermediate member, and
wherein a second linear object extending toward an end effector of the hollow arm is connectable to a leading end portion of the intermediate member.

14. The installing device according to claim 13, wherein the second linear object is passable through an open arm that is turnable relative to the hollow arm and that is open on at least one surface of the open arm in a radial direction perpendicular to an extension direction in which the open arm extends.

15. The installing device according to claim 1, further comprising:
an intermediate member disposed at a leading end portion of the hollow arm, the leading end portion being opposite to the base end portion in the extension direction,
wherein the linear object is connectable to a base end portion of the intermediate member, and
wherein a second linear object extending toward an end effector of the hollow arm is connectable to a leading end portion of the intermediate member.

16. The installing device according to claim 15, wherein the second linear object is passable through an open arm that is turnable relative to the hollow arm and that is open on at least one surface of the open arm in a radial direction perpendicular to an extension direction in which the open arm extends.

17. A robot comprising:
a base rotatable about a base axis of the base perpendicular to a ground surface;
a first arm supported by the base and turnable about a first axis perpendicular to the base axis;
a second hollow arm supported by a leading end portion of the first arm at a base end portion of the second arm and turnable about a second axis parallel to the first axis;
a third hollow arm supported at a base end portion of the third arm by a leading end portion of the second arm opposite to the base end portion of the second arm and rotatable about a third axis perpendicular to the second axis;
a fourth arm supported at a base end portion of the fourth arm by a leading end portion of the third arm opposite to the base end portion of the third arm and turnable about a fourth axis orthogonal to the third axis; and
an installing device comprising:
a connection member disposed at the base end portion of the second hollow arm which extends in an extension direction and which has a hollow extending in the extension direction and a rotatable support rotatable about the third axis, a linear object passing through the hollow and having an end which projects from the base end portion of the second hollow arm and which is connected to the rotatable support of the connection member to the; and
a linear motion support supporting the connection member slidably with respect to the second hollow arm in the extension direction.

* * * * *